United States Patent Office 2,788,860
Patented Apr. 16, 1957

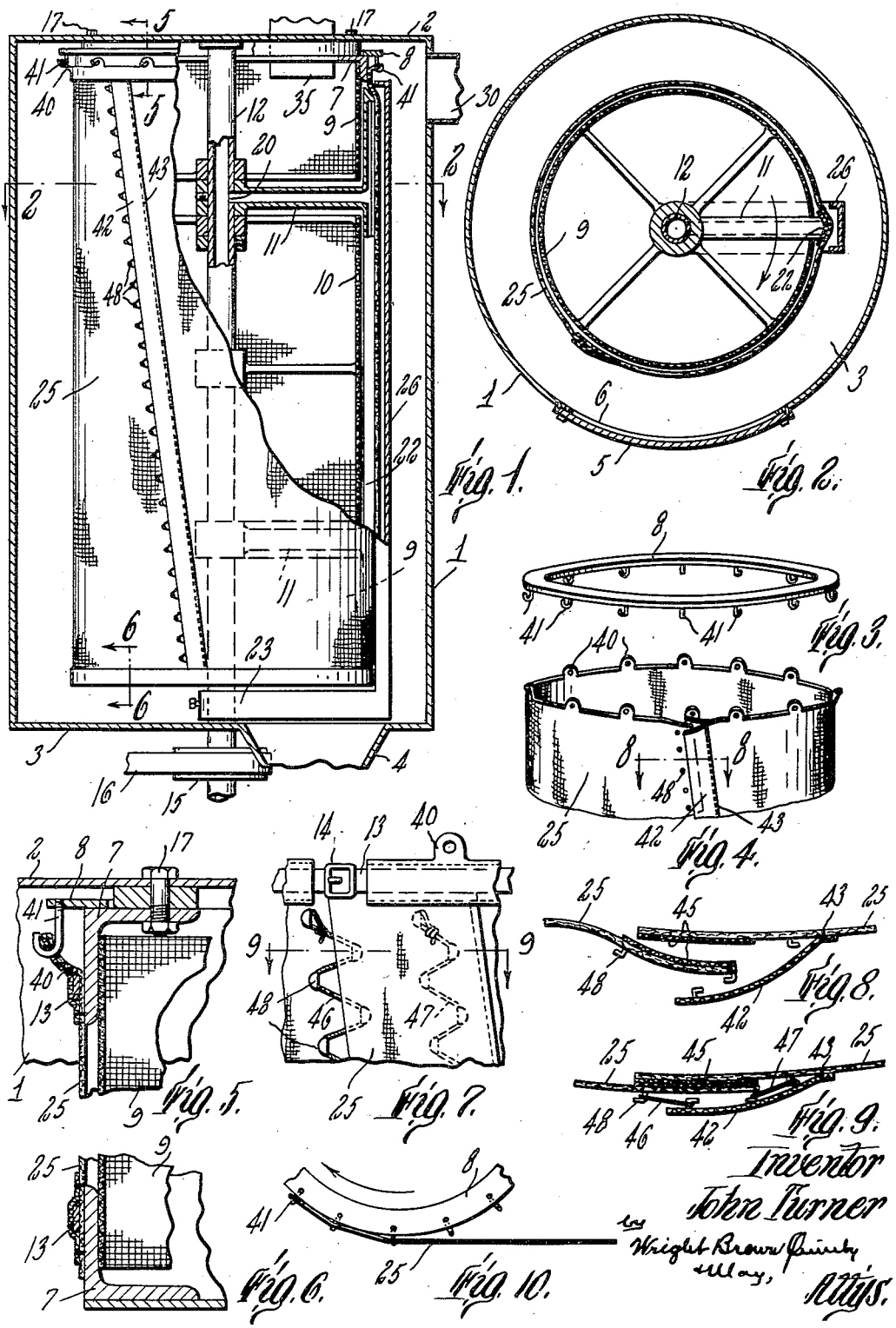

2,788,860
DUST FILTER

John Turner, Newton, Mass., assignor, by mesne assignments, to Koppers Company, Inc., Pittsburgh, Pa., a corporation of Delaware Application June 16, 1954, Serial No. 437,157

3 Claims. (Cl. 183—62)

This invention relates to dust filters of the type wherein dust-laden air is caused to flow against a porous filter element, the air passing through the filter element as the result of a differential in gaseous pressure on opposite sides of the element, and more particularly where the filter element is in the form of a substantially upright tube of flexible material such as felt or fabric.

As heretofore constructed it has been a very difficult and time consuming matter to install or replace such a filter element.

The present invention has for an object, therefore, to so construct and mount such an element that installation or replacement is easily and expeditiously carried out.

To this end the element, in accordance with this invention, is constructed as a single sheet provided along its upper edge with easily detachable elements for progressively securing it to or detaching it from a ring mounted for rotation at the upper end of the filter casing, the ring being turned as the elements are successively attached or detached. The side edges of the sheet are arranged to be detachably secured together in such fashion as to effectively seal them together.

For a complete understanding of this invention, reference may be had to the accompanying drawings in which Figure 1 is a vertical sectional view of a filter embodying the invention and showing the filter element partly in side elevation and partly broken away and in section.

Figure 2 is a horizontal sectional view on line 2—2 of Figure 1.

Figure 3 is a perspective view of a ring for supporting the upper edge of the filtering element.

Figure 4 is a fragmentary perspective view of the upper portion of the filtering element showing parts for cooperation with the ring of Figure 3.

Figures 5 and 6 are detail sectional views to a larger scale on lines 5—5 and 6—6, respectively, of Figure 1.

Figure 7 is a fragmentary side elevation to the scale of Figures 5 and 6 of the lapping edges of the filtering element adjacent to its upper end.

Figure 8 is a detail sectional view to a larger scale on line 8—8 of Figure 4.

Figure 9 is a view similar to Figure 8, but showing the edges of the filtering element laced together.

Figure 10 is a fragmentary top elevation of the filtering element holding ring showing the filtering element partly secured thereto.

Referring first to Figures 1 and 2, there is shown a cylindrical casing 1 having a top 2, and a bottom 3 having a discharge passage 4 for solids filtered out from the air being treated. The side wall is provided with a door 5 normally closing a doorway 6.

Within the casing there is positioned a supporting frame 7 shown in Figure 1 as of angle cross section and which is suspended from the top wall 2 as by bolts 17. Seated on this member 7 is a ring member 8 which may be turned about it own axis which generally coincides with the axis of the casing.

Within the casing are superposed annular foraminous elements 9 and 10, the elements 9 being positioned above and below the element 10 and spaced apart sufficiently for the passage of horizontal pipes 11 fixed to a hollow shaft 12 arranged coaxially within the casing, this hollow shaft being provided at its lower end below the casing wall 3 with means such as a belt pulley 15 by which it may be rotated as by a driving belt 16. Air may be supplied to the hollow of the shaft 12 by suitable means as at its lower end, this air passing through a side passage 20 therein into the pipe 11 which carries at its outer end an upright blow pipe 22. This blow pipe 22 is provided with holes or slots in its outer face through which air may escape against the inner face of a tubular filtering element 25, this element extending between the reticulated members 9 and 10 and a U-shaped casing 26. Thus the member 26 lies outwardly of the filtering element 25 and the portion 22 of the blow pipe passes between the filtering element 25 and the foraminous casing members 9 and 10. The member 22 is secured to the shaft 12 at its lower end 23.

Air to be filtered is introduced into the casing 1 as through the duct 30 toward its upper end and passes through the filtering element 25 and the foraminous members 9 and 10. The dirt filtered out drops down from the outer face of the filtering element 25 into a hopper at the discharge opening 4, while the filtered air passes through the interiors of the elements 9 and 10 and escapes through the clean air duct 35 shown in Figure 1. The face of the pipe 22 which engages the filtering element 25 is provided in the usual manner with a longitudinal slot, thus to deliver air for cleaning the filtering element in the opposite direction to the air to be filtered, blowing off the accumulations of solid material from the outer face of the filtering element.

As heretofore formed, these filtering elements have been made in tubular form and it has been a difficult matter to insert or replace such a filtering element into the casing. However, in accordance with the present invention, this filtering element 25 is formed as a piece of sheet material provided along its upper margin with elements such as eyes 40 which are spaced to engage suitable elements such as hooks 41 depending from the ring 8.

With this construction, a filtering element to be attached in place has one edge portion passed through the doorway 6, its upper edge being hooked onto the portion of the ring 8. This ring portion 8 may then be turned about its axis, progressively moving the starting side edge of the filter around the foraminous members 9 and 10 until the entering edge finally completes its encirclement and is opposite to the doorway 6. A tape or strip 13 may be attached to the upper and lower portions of the element 25 and its ends may be secured together as by the buckle 14 and against the frame 7, as shown in Figures 5, 6 and 7.

The opposite side edges of the filtering element are formed to be closed together in sealing engagement with each other. For this purpose, one of these side edges is shown in Figures 8 and 9 as formed double, being provided with an outer layer 42 secured thereto as by stitching 43, and the opposite single side edge may be inserted between the double layers as shown in Figure 9 and the two may then be laced together.

In order to provide a close air tight joint along the side edges, mating surfaces on the two ends may be provided with a pile fabric coating such as velveteen as shown at 45 (Figures 8 and 9) so that when these two edges are brought together and secured they will form an air tight joint therebetween. These side edges may be secured together as by lacing with the laces 46 and 47 (see Figure 7) which engage about hooks 48 suitably secured to the outer faces of the double and single edges as shown. First, the lacing at 47 may be applied, securing the extreme edge portion of the single layer edge between the two layers of the double layer edge, whereupon the outer layer of the double edge may be brought in against the outer face of the single edge and there secured by the lacing 46.

As shown best in Figure 1, it is preferable that the joint between the side edges of the fabric layer which forms the filter tube be arranged at an angle to the vertical so that it is at an angle to the lengthwise axis of the filter tube, as this causes the tube 22 to progressively pass across the joint between the side edges from end to end of the filter tube during operation of the filter.

It will thus be seen that it is an easy matter to apply a new filter tube or to replace an old one, the upper edge of the filter tube material being progressively attached to or detached from the ring 8 while the side edges of the filter tube are unsecured together. After the filter tube has been suspended from the ring 8 completely around its periphery, the side edges of the filtering element are them secured to form the desired tubular filtering element.

During the operation of the filter, the air to be filtered is introduced into the casing outwardly of the filtering element and its foraminous supporting member, the clean air passing through both these parts and escaping through the passage 35 while the dirt which accumulates on the filter tube is detached either by gravity or by the action of the blow pipe 22 and finds its way out through the discharge passage 4, while the cleaned filtered air escapes from within the foraminous support to the atmosphere.

It will thus be seen that it is an easy matter to insert or renew a filtering element with respect to the filter as shown herein.

From the foregoing description of an embodiment of this invention, it should be evident to those skilled in the art that various changes and modifications may be made therein without departing from its spirit or scope.

I claim:

1. A filter comprising a support, a ring carried by said support for turning relative to said support substantially about its axis, a filtering element comprising sheet material having means along its upper edge for detachably suspending it from said ring, said filtering element having side edge portions arranged in lapping relation, and means for securing said edge portions together to form a filter tube suspended from said ring, said side edge portions being arranged at an angle to said axis.

2. A filter comprising a support, a filtering element depending from said support, said filtering element having one double side edge portion and one single side edge portion arranged to be inserted between the layers of said double side edge portion in lapping relation thereto, and means for securing said edge portions together to form a filter tube, certain of the layers of said lapping arrangement being surfaced with a pile fabric to make sealing engagement with the adjacent layer at said side edge portions.

3. A filter comprising an upright cylindrical casing having a side door, a support arranged substantially coaxial within said casing, a horizontal ring carried by said support at its upper end for turning relative to said support substantially about the axis of said casing, a filtering element comprising sheet material having means having side edge portions and means along its upper edge for detachably suspending it from said ring and insertable progressively from one side edge into said casing when said door is open, and means for detachably securing the side edges of said fiiltering element together to form a tube suspended from said ring.

References Cited in the file of this patent
UNITED STATES PATENTS

| Number | Name | Date |
| --- | --- | --- |
| 934,076 | Kneuper | Sept. 14, 1909 |
| 1,755,969 | Shigyo | Apr. 22, 1930 |
| 1,930,659 | Purdy | Oct. 17, 1933 |
| 2,347,177 | Dow | Apr. 25, 1944 |
| 2,678,109 | Vedder | May 11, 1954 |
| 2,689,020 | Hersey | Sept. 14, 1954 |

FOREIGN PATENTS

| Number | Country | Date |
| --- | --- | --- |
| 148,799 | Great Britain | Oct. 20, 1921 |